(12) United States Patent
Voss

(10) Patent No.: US 11,802,577 B2
(45) Date of Patent: Oct. 31, 2023

(54) SYSTEM FOR A TOWER SEGMENT OF A TOWER, A RESPECTIVE TOWER SEGMENT, AND A WIND TURBINE HAVING A TOWER SEGMENT

(71) Applicant: General Electric Renovables Espana, S.L., Barcelona (ES)

(72) Inventor: Stefan Bernhard Voss, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 26 days.

(21) Appl. No.: 17/541,652

(22) Filed: Dec. 3, 2021

(65) Prior Publication Data
US 2022/0178391 A1 Jun. 9, 2022

(30) Foreign Application Priority Data
Dec. 8, 2020 (EP) .................................... 20212544

(51) Int. Cl.
*F15D 1/10* (2006.01)
*F03D 13/20* (2016.01)

(52) U.S. Cl.
CPC .............. *F15D 1/10* (2013.01); *F03D 13/20* (2016.05); *F05B 2240/122* (2013.01); *F05B 2240/912* (2013.01); *F05B 2260/964* (2013.01)

(58) Field of Classification Search
CPC .......... F05B 2240/122; F05B 2260/964; F15D 1/10; F03D 13/20
See application file for complete search history.

(56) References Cited

U.S. PATENT DOCUMENTS 9,416,557 B2 * 8/2016 Moeller .................. E04H 12/00
9,534,415 B2 * 1/2017 Moeller .................. E04H 12/00
(Continued)

FOREIGN PATENT DOCUMENTS

CN    206785562 U    12/2017
CN    211474341 U    9/2020
(Continued)

OTHER PUBLICATIONS

European Search Report Corresponding to EP20212544.9 dated May 17, 2021.
(Continued)

*Primary Examiner* — Andrew J Triggs
(74) *Attorney, Agent, or Firm* — Dority & Manning, P.A.

(57) ABSTRACT

A system for a tower segment of a tower is presented, wherein the tower segment is configured for forming at least partially a part of a tower for carrying a structure, in particular for supporting a nacelle of a horizontal-axis wind turbine or a machine house of a vertical-axis wind turbine. The system is configured to be attached, arranged, and/or mounted to the tower segment and comprises at least an airflow manipulation arrangement and a support arrangement. The airflow manipulation arrangement includes an airflow manipulator which is configured for affecting an airflow around the tower segment. The support arrangement is configured for supporting the airflow manipulation arrangement and for mounting the airflow manipulation arrangement to the tower segment. The airflow manipulation arrangement and the support arrangement are configured such, when mounted to the tower segment, that the airflow manipulator projects a tower diameter in radial direction by at least 5%, in particular at least 10%, preferred at least 15%, in particular not more than 30%, further in particular not more than 20%, of the tower diameter, or that the airflow (Continued)

manipulator is essentially parallel to the tower segment. By this, an effective measure against vortex shedding effects is put in place.

17 Claims, 4 Drawing Sheets

(56) References Cited

U.S. PATENT DOCUMENTS

| | | | | |
|---|---|---|---|---|
| 9,567,745 | B2* | 2/2017 | Moeller | F03D 13/40 |
| 10,294,924 | B2* | 5/2019 | Altmikus | F03D 1/06 |
| 10,808,683 | B2* | 10/2020 | Jensen | F03D 80/00 |
| 11,454,041 | B2* | 9/2022 | Ma | F03D 13/20 |
| 2015/0361951 | A1* | 12/2015 | Zamora Rodriguez | F03D 1/0633 |
| | | | | 416/236 R |
| 2015/0361958 | A1* | 12/2015 | Wood | F03D 13/20 |
| | | | | 416/1 |
| 2022/0178391 | A1* | 6/2022 | Voss | F03D 13/10 |

FOREIGN PATENT DOCUMENTS

| | | |
|---|---|---|
| EP | 3029313 A1 | 6/2016 |
| WO | WO2018/149527 A1 | 8/2018 |

OTHER PUBLICATIONS $41^{st}$ Aerospace Sciences Meeting and Exhibit, Jan. 6, 2023-Jan. 9, 2023, Reno, Nevada, Weblink Only https://doi.org/10.2514/MASM03.

Mendoza, Mechanism to Mitigate Turbine Tower Shedding Noise, Siemens AG, Prior Art Journal 2018, XP007017502, #08, Boulder Colorado, Apr. 19, 2018, pp. 160-162.

Patel, Wind and Solar Power Systems (Hardback Book)—$2^{nd}$ Edition, CRC Press I, LLC, 2005. (Summary Only).

Van Deen Abeele et al., Numerical Modelling of Vortex Induced Vibrations in Submarine Pipelines, Proceedings of the COMSOL Conference 2008, Hannover, 6 Pages. https://www.comsol.nl/paper/download/37737/VandenAbeele.pdf.

* cited by examiner

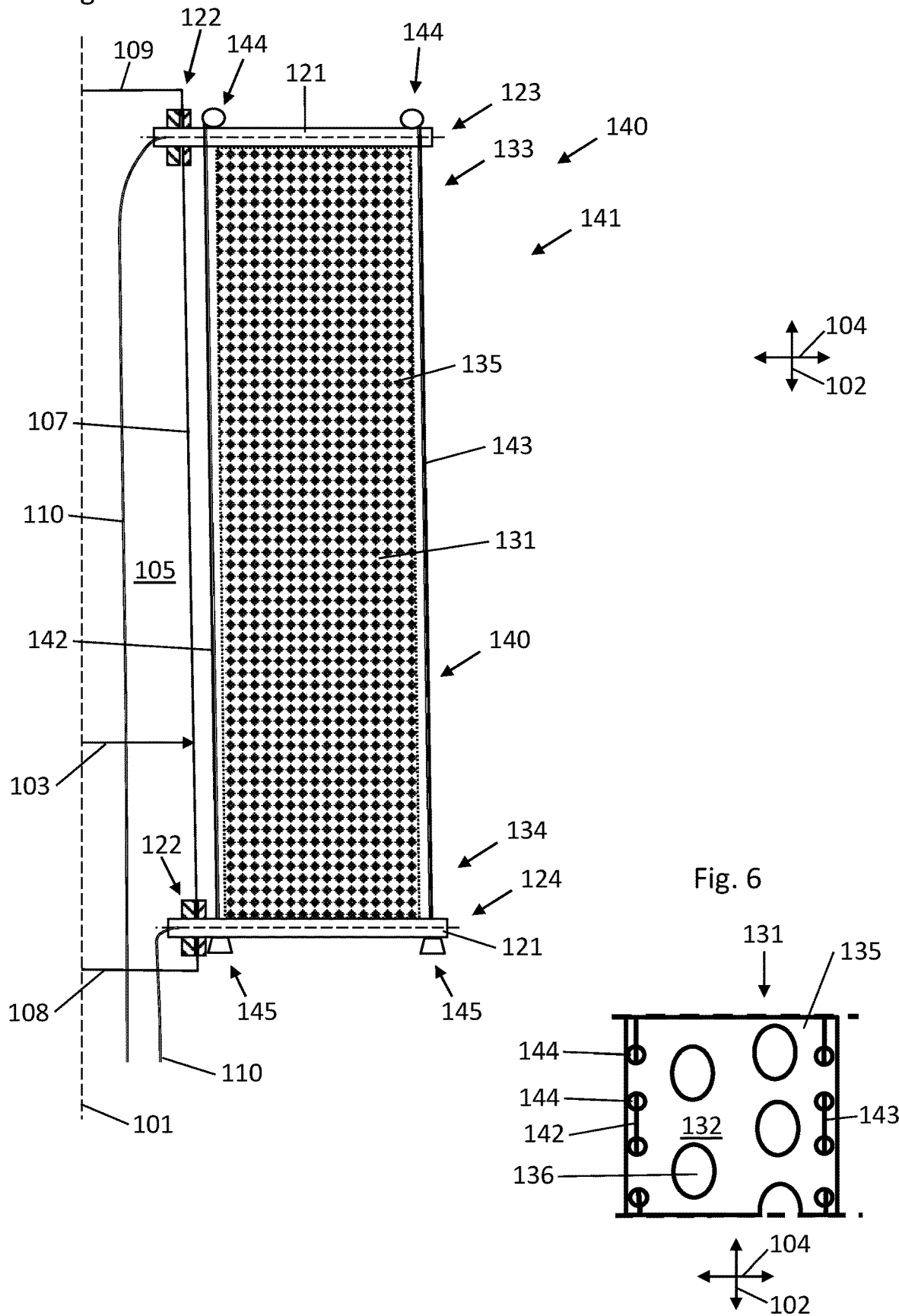

SYSTEM FOR A TOWER SEGMENT OF A TOWER, A RESPECTIVE TOWER SEGMENT, AND A WIND TURBINE HAVING A TOWER SEGMENT

FIELD

The present subject matter relates generally to towers and towers of wind turbines, and more particularly to a tower segment of a tower of the wind turbine. Furthermore, a wind turbine having a tower made from such tower segments is disclosed.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbines, but also other devices or arrangements, which operate in an elevated position over a surface of a respective ground, are often arranged on top of a tower supporting said device or technical arrangement. A tower is therefore subject of wind dynamics which can lead to undesired loads and status of the tower.

Accordingly, the present disclosure is directed to provide a system for a tower segment, an improved tower segment having said system, an improved tower including said tower segment, and a wind turbine having set tower, in order to mitigate the disadvantages related to the known art. In particular, the erection process of respective tower shall be also rendered more efficiently.

BRIEF DESCRIPTION

Aspects and advantages of the invention will be set forth in part in the following description, or may be obvious from the description, or may be learned through practice of the invention.

In one aspect, the present disclosure is directed to a system for a tower segment of a tower, wherein the tower segment is configured for forming at least partially a part of a tower for carrying a structure, in particular for supporting a nacelle of a horizontal-axis wind turbine or a machine house of a vertical-axis wind turbine.

The tower segment and/or the respective tower has a longitudinal direction defined by a longitudinal axis and a radial direction defined by a radius, wherein a respective radius is extending in a (horizontal) plane being perpendicular to the longitudinal axis. Consequently, a circumferential direction lying in the radial (horizontal) plane can be determined. If not said otherwise, all references, specifications, orientations and directions as provided in the current disclosure are associated to the longitudinal, radial or circumferential direction of the tower segment and/or of the respective tower.

It is to be noted, that all directional references as provided within the current disclosure are provided with respect to a tower segment or a tower being in an operational state, in particular are provided with respect to the erected tower. The term "operational state" does not require that the technical structure which is supported by the tower (e.g. a nacelle of the wind turbine) needs to be in operation or even being mounted.

The system is configured to be attached, arranged, and/or mounted to the tower segment and comprises at least an airflow manipulation arrangement and a support arrangement. The airflow manipulation arrangement includes an airflow manipulator which—when mounted to the tower segment—is configured for affecting an airflow around the tower segment. For example, the airflow manipulator can be a flexible sheet being mounted to the tower segment and extending in radial direction, wherein an airflow passing around the tower and/or tower segment is re-directed and/or partially blocked by the airflow manipulator.

The support arrangement is configured for supporting the airflow manipulation arrangement and for mounting the airflow manipulation arrangement to the tower segment.

According to one aspect of the current disclosure, the airflow manipulation arrangement and the support arrangement are configured such, when mounted to the tower segment, that the airflow manipulator projects a tower diameter in radial direction by at least 5%, in particular at least 10%, preferred at least 15%, in particular not more than 30%, further in particular not more than 20%, of the tower diameter. Hence, the airflow manipulator is extending beyond a radial diameter of the tower and/or of the tower segment by at least the provided values such that vortex shedding effects caused by an airflow facing the tower segment and affecting the tower segment are reduced by the airflow manipulator.

Alternatively, or in addition to the preceding aspect, a further aspect is introduced: when the airflow manipulation arrangement including the airflow manipulator is mounted to the tower segment with the help of the support arrangement, the airflow manipulator is projecting the tower segment in radial direction and is extending along the tower segment essentially in longitudinal direction such, that a vortex shedding effect affecting the tower caused by an airflow facing the tower is reduced by the airflow manipulator. By arranging the airflow manipulator essentially parallel to the tower segment an effective measure against vortex shedding effects is put in place.

In fact, both aspects, individually and as well in (partial) combination, are capable for the first time of providing a beneficial effect for a tower segment and/or tower formed by at least one of those tower segments: the system can be mounted to a tower or tower segment which is in the process of being directed, or even before being directed, wherein negative effects of a Kármán vortex street can be drastically reduced or even prevented. The use of the airflow manipulation arrangement influences an airflow around the tower segment in that way that a formation of an asymmetrical flow pattern forms around the body and related changes of the pressure distribution is prevented. This means that an alternate shedding of vortices cannot create periodic lateral (sideways) forces on the tower segment. By this an unwanted excitation of the tower—possibly near any eigenfrequency—is avoided.

According to an embodiment, the system is configured such that the airflow manipulation arrangement and the support arrangement can be temporarily attached to the tower segment by mounting and by a subsequent dismounting.

The term "tower segment" refers to a component of a tower which is subject to vibrations which can be caused by vortex shedding effects. According to a preferred embodiment, the tower can be formed by a plurality of tower segments being mounted to each other at flanches in longitudinal direction. However, a tower may as well be formed by one sole tower segment, and/or by a tower portion being different from a tower segment and by a tower segment.

According to an embodiment, the airflow manipulator—when being mounted to the tower segment—is extending the tower segment in longitudinal direction about a relevant, effective length. Specifically, at least 20% of the longitudinal length of the tower segment comprises the airflow manipulator, which is in longitudinal direction arranged essentially parallel to the longitudinal axis of the tower segment and which is projecting the tower segment in radial direction.

Preferably, the airflow manipulator is extending the tower segment in longitudinal direction more than 30%, in particular more preferably more than 50%, and more preferred more than 80% of the longitudinal length of the tower segment.

However, according to another embodiment—partially an additional or alternative embodiment—the airflow manipulator is extending the longitudinal length of the tower not more than 90%, in particular not more than 80%, further in particular not more than 60%.

According to an embodiment, the term "the airflow manipulator projects a tower diameter" or "the airflow manipulator is extending along the tower segment" reflects that the airflow manipulator causes the presence of a reference area/projecting surface being located on or neighboring the external surface of the tower segment extending in a radial direction and/or in the longitudinal direction of the tower segment. In particular, the airflow manipulator forms a projected surface or a reference area perpendicular to the radial plane and/or extending parallel with respect to a radial direction of the segment. For example, the airflow manipulator can be a three-dimensional object having a projected surface or reference area perpendicular to the wind direction; a specific example, a sphere has a circular form as projected surface or reference area, a cylindrical form extending in longitudinal direction of the tower segment has a projected surface having a rectangular form.

According to an embodiment, the airflow manipulator forms an effectively flat surface extending perpendicular to the radial plane and/or extending parallel with respect to a radial direction of that segment. The term "effectively flat" refers to the airflow manipulator when being mounted to the tower segment, wherein the form of the effectively flat surface enables the mitigation and/or reduction of vortex shedding effects affecting the tower segment. For instance, if the airflow manipulator is subject to wind pressure, and therefore is bulging into a convex form in airflow direction, by definition such bulged airflow manipulator still comprises an essentially flat surface.

The support arrangement is configured such that the effectively flat surface does not deviate from a plane formed by the longitudinal direction and the radial direction—which could be defined as a radial plane—by more than 45°, in particular not more than 30°, preferably by not more than 15°.

Additionally, or in the alternative, the support arrangement and/or the airflow manipulation arrangement is embodied such, that the airflow manipulator is essentially extending in one of the radial planes, while still having the effectively flat surface.

According to a beneficial aspect of the current disclosure, the airflow manipulator is configured such that a drag coefficient of the airflow manipulator does not exceed 1, in particular does not exceed 0.6, preferably does not exceed 0.4, or more preferably does not exceed 0.3. Additionally or in the alternative, the airflow manipulator has a relative permeability of at least 500 liter per minute per square meter [l/(min*m$^2$)], in particular at least 1000, preferred at least 2000 liter per minute per square meter [l/(min*m$^2$)], furthermore, in particular not more than 25000 liter per minute per square meter [l/(min*m$^2$)], further in particular not more than 20000, preferred not more than 15000 liter per minute per square meter [l/(min*m$^2$)].

In particular, or in the alternative, the airflow manipulator is configured such, that a surface of the airflow manipulator is not airtight and/or is not fully anticipating forces caused by wind pressure. For example, measures against vortex shedding effects as currently used mainly comprise airflow manipulation devices, for example strakes, which are fully airtight and non-permeable with respect to the airflow. As an example, tall metal smokestacks or other tubular structures such as antenna masts or tethered cables can be fitted with an external airtight corkscrew fin to introduce turbulence, so the load is less variable and resonant load frequencies have negligible amplitudes. It is to be noted as being a beneficial effect of the present disclosure, that complex and costly solutions as currently used can be avoided.

By configuring the airflow manipulator such, that a certain amount of an airflow facing the airflow manipulator may stream through the airflow manipulator, the positive effect for mitigating vortex shedding effects is maximized, wherein a disadvantageous of applying airflow related forces onto the tower segment is minimized. By this, the airflow manipulation arrangement may extend in radial direction about a predetermined length for preventing the formation of a vibration-causing Kármán vortex street, wherein pressure caused (static) forces affecting the tower by forming a bending moment are still acceptable.

According to a further aspect of the present disclosure, the airflow manipulator comprises a fabric, in particular the airflow manipulator is essentially made of a fabric. The term "essentially made of the fabric" reflects that at least 50%, preferably at least 70% of the airflow manipulator is made of the fabric. Hence, the airflow manipulator may have a sail-like appearance, wherein such sail is perpendicularly arranged with respect to the tower segment. In particular, the fabric can be a coarse-mesh fabric.

The airflow manipulator may have a mesh size of at least 0.02 millimeters, preferably at least 0.5 mm, in particular of at least 1 mm.

Alternatively, the airflow manipulator may comprise a plurality of effective openings, in particular wherein the airflow manipulator itself is made from a relatively airtight material. This embodiment differs from the embodiment having a mesh by the relatively large size of the openings respect to the overall airflow manipulator, for example, an opening according to the described embodiment may have a diameter of at least 5% of the radial width of the airflow manipulator.

According to an embodiment, an effective opening can have a circular, oval shape, or it is formed by a longitudinal slit or similar, or by a combination thereof.

Aforementioned embodiments of the airflow manipulator include the embodiments of the airflow manipulator at least partially consisting of a mesh or of a fabric and as well the embodiment of the airflow manipulator having an airflow manipulator surface with openings.

According to a specific embodiment, support arrangement comprises a support beam configured for being mountable to the tower wall and a support fixation device configured for fixating the support beam to the tower wall, in particular wherein, when mounted, the support beam extends essentially in radial direction. The support beam is configured for carrying—directly or indirectly—the airflow manipulation arrangement such that airflow manipulator extends the tower segment in radial direction as described in the preceding embodiments.

In one specific embodiment, the support arrangement comprises an upper support portion configured for receiving an upper manipulator portion of the airflow manipulator and a lower support portion configured for receiving a lower manipulator portion of the airflow manipulator such that the airflow manipulator is extending in longitudinal direction between the upper support portion and the lower support portion.

By this, the effectivity of the airflow manipulation arrangement is increased, in particular because the upper manipulator portion and the lower manipulator portion ensure that the airflow manipulator maintains its efficiently flat surface and/or that the bulging of the airflow manipulator is kept within acceptable limits.

The upper manipulator portion and the lower manipulator portion may both comprise a respective support beam, which can be mounted to a tower wall of the tower segment with the help of a respective support fixation device. For example, support beam and support fixation device may both be configured for holding the support beam in a position being essentially perpendicular to the longitudinal direction of the tower segment.

The upper manipulator portion can be mounted at an upper portion of the tower segment and the lower manipulator portion can be mounted at a lower portion of the tower segment, wherein a distance between the respective manipulator portion and the related end (tower flange) of the tower segment in longitudinal direction is less than 20%, preferred less than 10%, of an overall length of the tower segment in longitudinal direction.

In a further embodiment, the system comprises a mounting arrangement having mounting means for mounting the airflow manipulation arrangement to the support arrangement. For this purpose, the mounting arrangement comprises longitudinal holding means to be arranged in longitudinal direction between the upper support portion and the lower support portion.

The holding means may comprise a radially inner cable and a radially outer cable, wherein the support arrangement is configured such that the inner cable can be arranged more closely to the tower wall than the outer cable. By this, the holding means form a frame like support configuration, wherein the upper and lower support beam limit the support frame in longitudinal direction, and the outer cable and the inner cable act as radial limitations.

The mounting arrangement and the mounting means may be configured and positioned such, that a gap between a tower wall and the airflow manipulator does not exceed 5%, in particular does not exceed 3%, preferred does not exceed 2%, of the diameter of the tower segment. For example, the inner cable can be arranged in radial direction with respect to the tower wall having a distance of not more than 5%, in particular not more than 3%, preferred not more than 2% of the diameter of the tower segment.

According to an embodiment, the system may comprise at least three in particular four, preferably five, support arrangements, respective airflow manipulation arrangements, and respective mounting arrangements. For example, the support arrangements can be distributed equally around the tower segment.

Optional, the system may comprise assembling means configured for enabling at least partially a lowering of the support arrangement from the erected tower segment or from the erected tower. In particular, the system may comprise an assembling cable for supporting at least a part of the support arrangement during a disassembling process.

In one embodiment, the support arrangement comprises protection means configured for preventing the tower to be damaged or negatively impacted by a portion of the support arrangement when being lowered from its mounting position.

It is apparent for the skilled person, that the system, or at least an embodiment of the system as precedingly described, is configured to be mounted to a tower segment, in particular to a tower segment of a wind turbine, in order to mitigate vortex shedding effects possibly affecting of the tower segment. Usually, a tower segment for a large technical structure like a nacelle of the wind turbine has a notable size. A tower segment, for example of a tower of a typical wind turbine, has a diameter of at least 2.5 m, preferred of at least 3.5 m, more preferred of at least 4 m, and/or a length in the longitudinal direction of at least 10 m, preferred of at least 15 m, more preferred of at least 18 m.

Henceforth, it is noticeable for example from the size, the length and the width, of the airflow manipulation arrangement and/or of the support arrangement, if the system is suitable for being used at a tower segment of a wind turbine.

For example, if the airflow manipulation arrangement comprises an airflow manipulator having an elevated length while having a relatively small width, and/or if the support arrangement and/or the airflow manipulation arrangement are configured (and equipped with related instructions) for being attachable/detachable to a tower wall of a tower segment, then the system comprising the airflow manipulation arrangement and the support arrangements are indeed configured and suitable for being attached to a tower segment according to the current disclosure.

For example, a system having an airflow manipulation arrangement comprising an airflow manipulator, wherein the manipulator has a length of for example more than 5 m, preferably more than 10 m, possibly more than 12 m, while having a width of at least 0.4 m, preferably more than 0.8 m, or in particular more than 1 m, and wherein the system further comprises a support arrangement apparently being configured for supporting an upper portion of the airflow manipulation arrangement—for example holding openings, rings or screws are provided for mounting the airflow manipulator to the support arrangement —, said system is configured for being used with a tower segment of a tower of a large technical device such as a wind turbine.

According to a further aspect, a tower segment, preferably a tower segment of a wind turbine, having a system according to one of the preceding embodiments being attached to the tower segment is presented. This aspect focuses on the system being mounted to the tower segment, and thereby including both objects. The tower segment is part of a tower, preferably of a tower of a wind turbine, and has exemplary dimensions as discussed supra.

In the context of a specific embodiment it is described that the tower having a tower segment according to one of the preceding embodiments is configured for supporting a heavy technical structure. Such heavy technical structure can be a nacelle of a wind turbine. The weight of such technical structure and the configuration of the tower segment causes the tower segment and/or the tower including the tower segment to have at least a specific eigenfrequency when the technical structure is mounted to the tower (full-systemeigenfrequency), while having at least another eigenfrequency (interims-system-eigenfrequency) when there is no technical structure mounted to the tower or if the tower is in the process of being mounted.

According to an embodiment, if the heavy technical structure is mounted to the tower or to the tower segment, the tower segment and/or the tower are configured such that the tower/the tower segment cannot be excited—or at least cannot be effectively excited—by vortex shedding effects. That configuration includes that the full-system-eigenfrequency of the tower including the heavy technical structure is different from any exciting frequency caused by vortex shedding effects.

In contrast, if the overall structure, for example the wind turbine, is in the process of being erected, there is a certain timely phase when only the tower is erected without supporting the heavy technical structure mounted to the top of the tower. Specifically, during this phase, the tower and/or the tower segment can be heavily and negatively affected by vortex shedding effects because excitation frequencies of vortex shedding effects are in an effective range of the interims-system-eigenfrequency.

Therefore, it is one aspect of the current disclosure that the tower segment and/or a tower comprising such a tower segment is/are configured to have a full-system-eigenfrequency when the heavy technical structure, e.g. a nacelle of a wind turbine, is mounted to the tower segment, and that the tower segment and/or a tower comprising such a tower segment has/have at least a interims-system-eigenfrequency when no heavy technical structure, is mounted to the top of the tower segment and/or of the tower. The tower segment is configured such, that the full-system-eigenfrequency is different from an excitation frequency caused by vortex shedding effects. Furthermore, the tower segment is configured such that the interims-system-eigenfrequency is in the range of an excitation frequency caused by vortex shedding effects. The term "is different from an exciting frequency" reflects that no essential exciting can be affected, wherein the term "is in the range of an exciting frequency" means that an essential and potentially damaging resonance event or even a resonance catastrophic due to an effective periodic excitation can possibly take place. The term "excitation frequency caused by vortex shedding effects" represents a variety of frequencies caused by wind of variable that typical speed confronting the tower and flowing around the tower. The skilled person is able to determine the excitation frequency caused by vortex shedding effects when knowing dimensions and purpose of the tower segment.

In yet another aspect, the present disclosure is directed to a wind turbine having a nacelle mounted atop a tower having a tower segment with a system as described supra. The nacelle assembly includes a nacelle defining, at least, a plurality of side walls and a top wall. The nacelle rotatably supports a rotor including rotor blades.

In another aspect, the present disclosure is directed to a method for mounting a tower, in particular a tower of a wind turbine. The method comprising the following steps:

Mounting a support arrangement as described supra to a tower segment of a tower as described above;

prior or after to the preceding step, mounting/erecting the tower segment in order to form a tower;

mounting a further component, functional technical structure and/or a nacelle of a wind turbine to the top of the tower; and disassembling the system from the tower, for example by lowering the airflow manipulation arrangement from the support arrangement, and further for example by lowering the support arrangement from the tower segment. In the alternative, the system can as be dismounted as a whole.

The assembly process of this is can be embodied as follows: while the tower segments are still on the ground, the support arrangements can be mounted to the tower. For example, the respective support beam can protrude the tower, wherein (outer and) inner fixation device are provided for mounting the support beam in their perpendicular position with respect to the tower wall.

According to an embodiment, the tower may be erected by placing tower segments on each other by connecting respective tower flanges. Subsequently, the airflow manipulation arrangement can be lifted to the respective tower segment. Also, the airflow manipulation arrangement can be mounted to the tower segments prior to erecting these tower segments.

According to an embodiment, the system can be fully preassembled and mounted to a tower segment before erecting the tower or before erecting tower segment.

Alternatively, the system can be partially mounted to the tower segment, for example, only the support arrangement and/or the mounting arrangement is attached to a tower segment, wherein the airflow manipulation arrangement is mounted to the support arrangement and/or mounting arrangement after the tower segment is directed These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which:

FIG. 5 is a detailed sectional view in radial direction of the upper tower segment according to FIG. 3 displaying an airflow manipulation arrangement according to a first embodiment; and FIG. 6 is a partial side view on an airflow manipulation arrangement according to a further embodiment.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Figure 1:
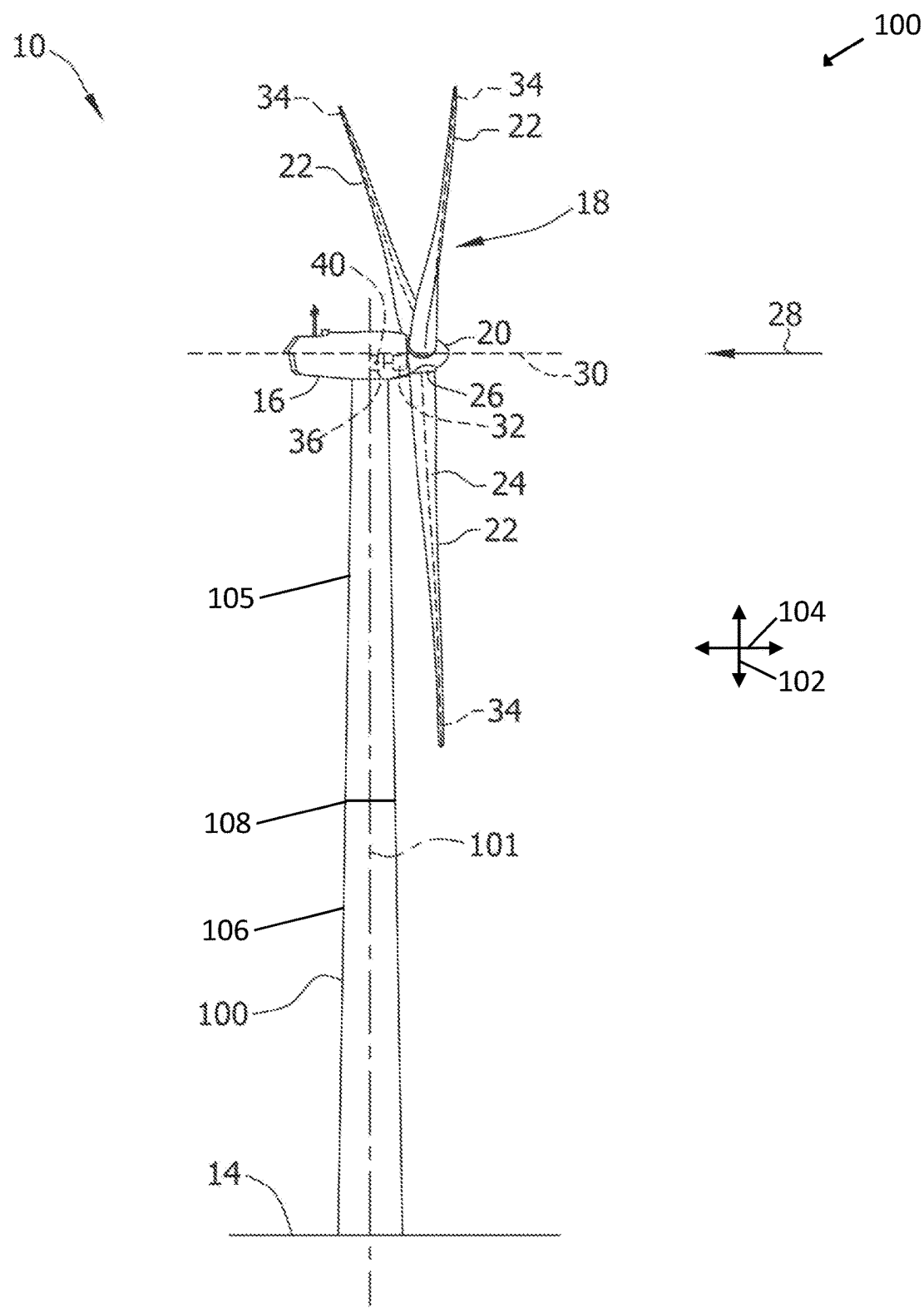
FIG. 1 illustrates a perspective view of one embodiment of an upper tower segment and a lower tower segment both forming a tower of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, the wind turbine 10 is a horizontal-axis wind turbine. Alternatively, the wind turbine 10 may be a vertical-axis wind turbine. In the exemplary embodiment, the wind turbine 10 includes a tower 100 that extends from a support system 14, a nacelle 16 mounted on tower 100, and a rotor 18 that is coupled to nacelle 16. The rotor 18 includes a rotatable hub 20 and at least one rotor blade 22 coupled to and extending outward from the hub 20. In the exemplary embodiment, the rotor 18 has three rotor blades 22.

The tower 100 is formed by an upper tower segment 105 and a lower tower segment 106 both having a tower wall 107, which are connected to each other with the help of adjacent tower flanges 108. In the exemplary embodiment, the tower 100 is fabricated from tubular steel to define a cavity (not shown in FIG. 1) between a support system 14 and the nacelle 16. In an alternative embodiment, the tower 100 is any suitable type of a tower having any suitable height.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In one embodiment, the rotor blades 22 have a length ranging from about 15 meters (m) to about 91 m. Alternatively, rotor blades 22 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about an axis of rotation 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines a perspective of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may change a pitch angle of the rotor blades 22 such that the rotor blades 22 are moved to a feathered position, such that the perspective of at least one rotor blade 22 relative to wind vectors provides a minimal surface area of the rotor blade 22 to be oriented towards the wind vectors, which facilitates reducing a rotational speed and/or facilitates a stall of the rotor 18.

In the exemplary embodiment, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the exemplary embodiment, as the wind direction 28 changes, a yaw direction of the nacelle 16 may be rotated about a yaw axis 38 to position the rotor blades 22 with respect to wind direction 28. For this purpose, the nacelle 16 is rotatably supported by the tower 100, more specifically, by a top flange 109 of the upper tower segment 105. According to certain embodiments, the yaw axis 38. Together with the longitudinal axes 101 of the tower 100.

In the exemplary embodiment, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
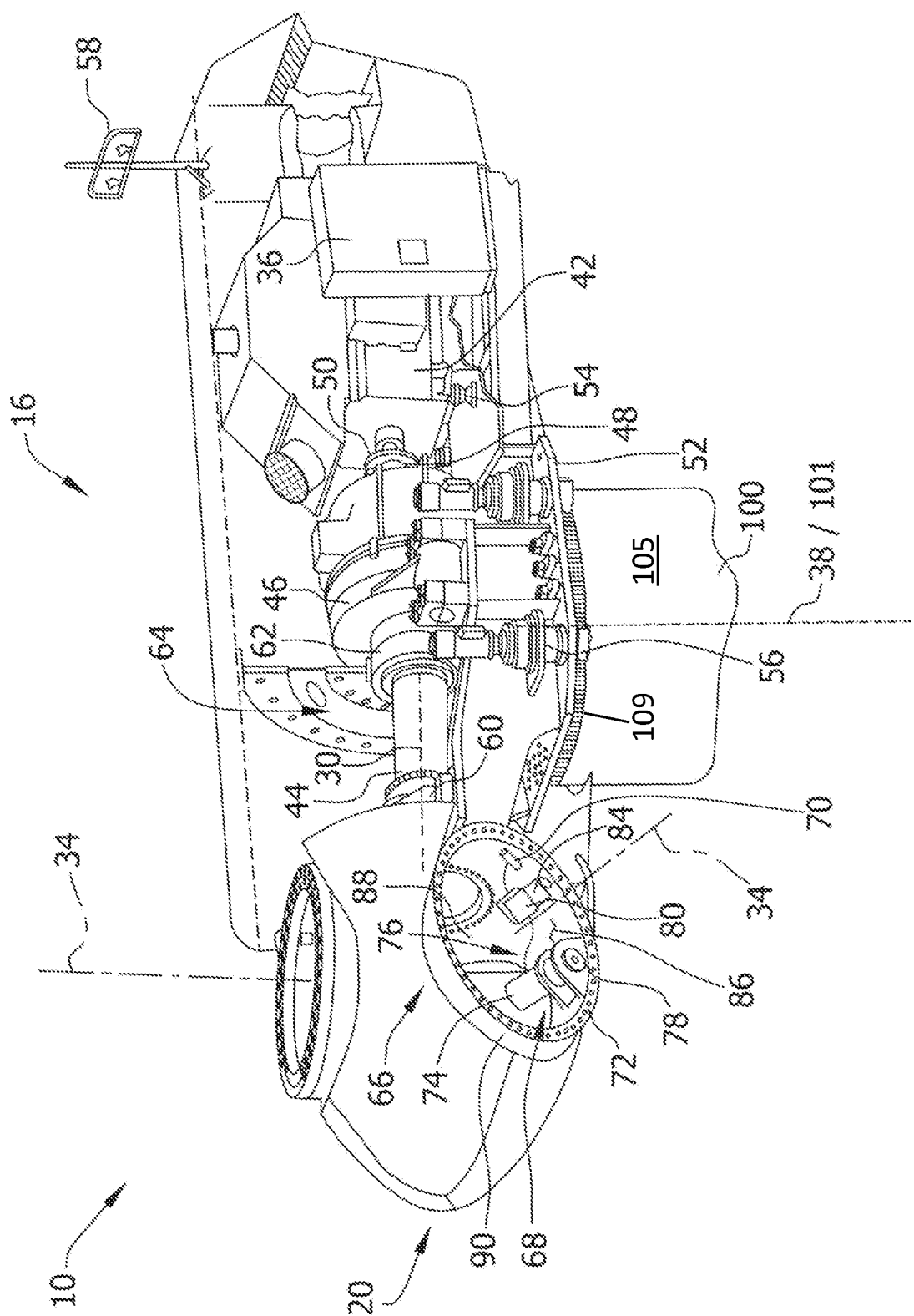
FIG. 2 illustrates a simplified, internal view of one embodiment of a nacelle of a wind turbine supported by the upper tower segment according to FIG. 1.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50.

The gearbox 46 and generator 42 may be supported by a main support structure frame of the nacelle 16, optionally embodied as a main frame 52. The gearbox 46 may include a gearbox housing that is connected to the main frame 52 by one or more torque arms. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the top flange 109 of the upper tower segment 105 of the tower 100 of the wind turbine 10.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28

The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64. However, the present disclosure is not limited to a wind turbine comprising a gearbox, but also wind turbines without a gearbox, thus, heading a so-called direct drive may be concerned as well.

For positioning the nacelle appropriately with respect to the wind direction 28, the nacelle 16 may also include at least one meteorological mast 58 that may include a wind vane and anemometer (neither shown in FIG. 2). The mast 58 provides information to the wind turbine controller 36 that may include wind direction and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servo-mechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During normal operation of the wind turbine 10, the wind turbine controller 36 controls the pitch drive system 68 to adjust a pitch angle of rotor blades 22.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 is able to make the pitch drive system 68 to move the rotor blade 22 to a feathered position for reducing a rotational speed of the rotor 18.

According to an embodiment, a power generator 84, for example comprising a battery and/or electric capacitors, is arranged at or within the hub 20 and is coupled to the sensor 70, the pitch control system 80, and to the pitch drive system 68 to provide a source of power to these components. In the exemplary embodiment, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the exemplary embodiment, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface 90 of hub 20 and may be coupled, directly or indirectly, to outer surface 90.

Figure 3:
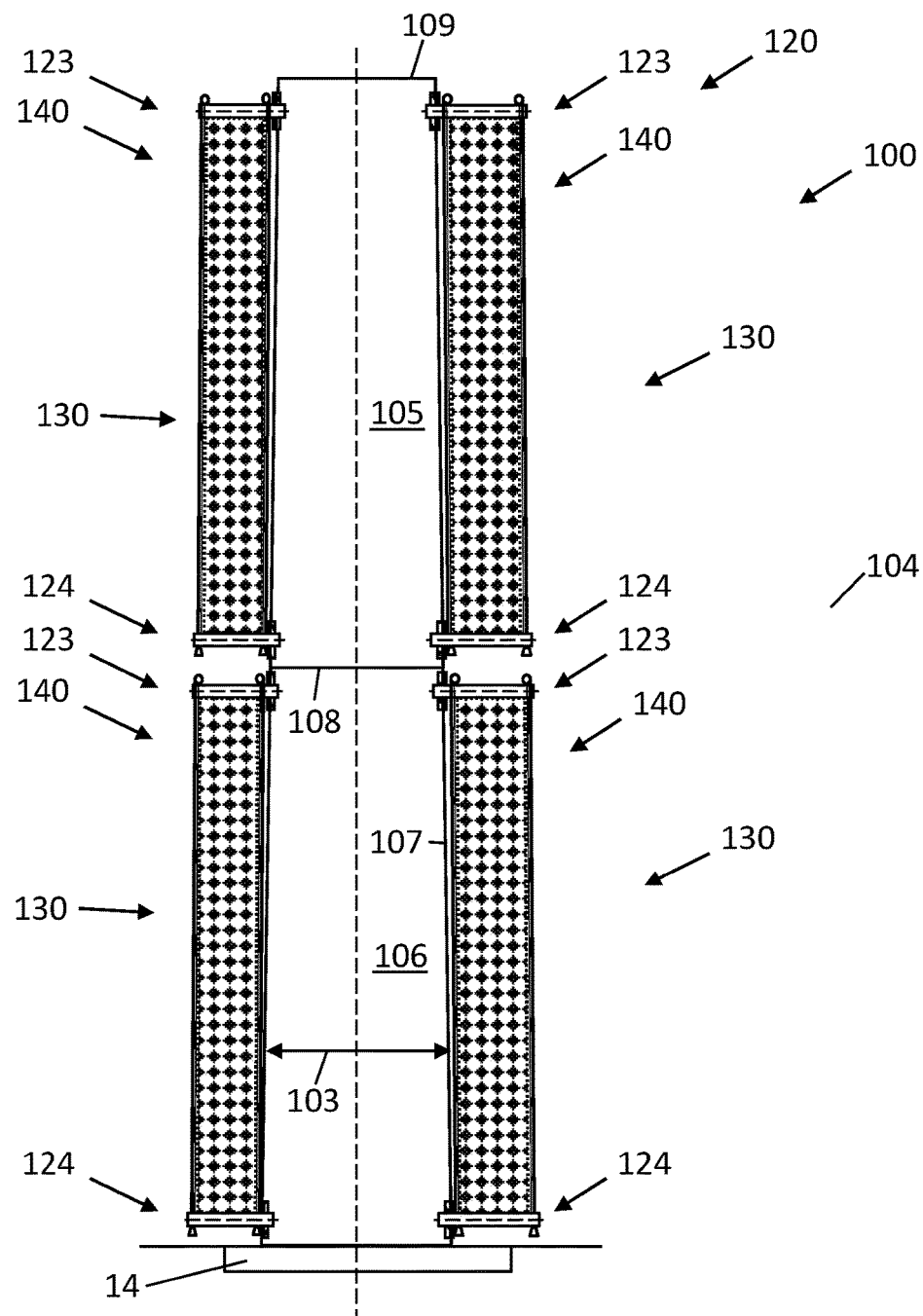
FIG. 3 illustrates a sectional view in radial direction through the tower according to FIG. 1, wherein a system according to the present disclosure is mounted to the tower segments.
Figure 4:
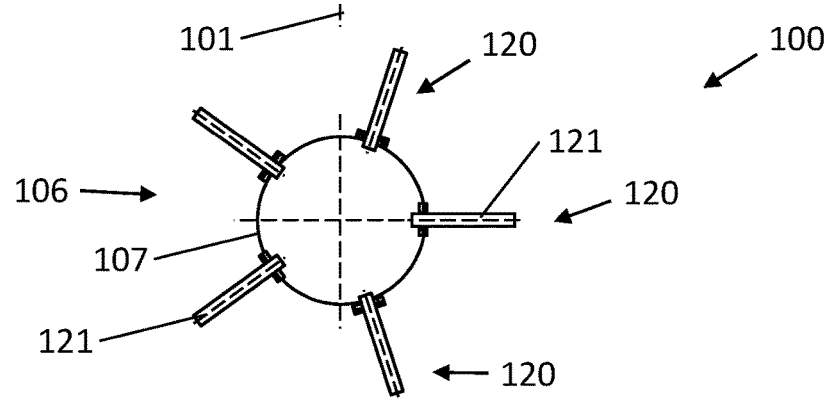
FIG. 4 is a sectional view in longitudinal direction showing the system and the upper tower segment according to FIG. 3.

FIG. 3 is a sectional view in radial direction and FIG. 4 is a sectional view in longitudinal direction through the tower 100 according to FIG. 1, wherein a system according to the present disclosure is assembled to the tower segments 105, 106. The system comprises an airflow manipulation arrangement 130, a support arrangement 124 for supporting the airflow manipulation arrangement 130 and for mounting the airflow manipulation arrangement 130 to a tower wall of 107 of the tower segments 105, 106.

The tower segments 105, 106 and/or the respective tower 100 have a longitudinal direction 102 defined by a longitudinal axis 101 and a radial direction 104 defined by a radius of the tower segment 105, 106, wherein a respective radius is extending in a (horizontal) plane being perpendicular to the longitudinal axis 101, 38. Consequently, a circumferential direction lying in the radial (horizontal) plane can be determined. If not said otherwise, all references, specifications, orientations and directions as provided in the current disclosure are associated to the longitudinal direction 102, radial direction 104 or circumferential direction of the tower segment 105, 106 and/or of the respective tower 100.

According to this embodiment it is shown in FIG. 4 that the system comprises five airflow manipulation arrangements 130 being mounted to the tower 107 of the upper tower segment 105 with the help of five respective support arrangements 120.

The tower 100 and/or the respective tower segment 105, 106 have an inner tower diameter 103, wherein the tower diameter 103 is varying in longitudinal direction 102.

FIG. 5 elaborates in detail an embodiment of the system being mounted to the upper tower segment 105. The support arrangement 120 may comprise an upper support portion 123 and a lower support portion 124, both including a support beam 121 which are mounted to the tower wall 107 with the help of respective support fixation devices 122.

Specifically, the support fixation device 122 and the support beam 121 may be configured such, that a support beam extends over an outer surface of the tower 107 in radial direction 104, in particular in a horizontal direction or perpendicular to the tower wall 107.

The airflow manipulation arrangement 130 comprises an airflow manipulator 131 extending in longitudinal direction 102 between the upper support portion 123 and the lower support portion 124. The upper support portion 123 supports an upper manipulator portion 133 of the airflow manipulator 131, while the lower support portion 124 is holding a lower manipulator portion 134 of the airflow manipulator 131. For this purpose, the system may include a mounting arrangement 140 which is effectively, at least partially, arranged between the upper manipulator portion 133 and the upper support portion 123, and effectively, at least partially, arranged between the lower manipulator portion 134 and the lower support portion 124.

The airflow manipulator 131 projects the tower diameter 130 in radial direction 140 by 5% to 20% of the tower diameter 130. Hence, the airflow manipulator 131 is extending beyond a radial diameter 103 of the tower 100 and/or of the tower segment 105, 106 such that vortex shedding effects caused by an airflow facing the tower segment 105, 106 are reduced by the airflow manipulator 131.

For example, the mounting arrangement 140 may include mounting means 141 such as ropes, cables 142 and 143, and related fixing devices 144, 145 like screws. Furthermore, the mounting arrangement 140 may include an inner cable 142, an outer cable 143, support devices 144 and tensioning devices 145. The inner cable 142 and the outer cable 143 are attached to the respective support beams 121 of the upper support portion 123 and the lower support portion 124 such, that a frame like support configuration is provided, wherein the upper and lower support beam 121 limit the support frame in longitudinal direction 102, and the outer cable 143 and the inner cable 142 act in radial direction 104.

The airflow manipulator 131 is made at least partially from a fabric 135 and is extending in the frame formed by the support beams 121 and the outer and the inner cable to 143, 144.

As shown in FIG. 3 and FIG. 4, a plurality of systems is provided in order to cover a large part of the length of the tower 100. When wind is flowing around the tower 100 having the system including the airflow manipulation arrangement mounted to the tower walls 107, an airflow cannot be established next to the surface of the tower wall 107 since the airflow is disturbed by the airflow manipulators 131. As a consequence, a Kármán vortex street affecting the tower cannot develop, which effectively inhibits negative effects of vortex shedding.

As reflected by FIG. 3 and FIG. 5, the fabric 135 of the airflow manipulator 131 is not airtight in its entirety, but has an increased permeability due to a predetermined mesh configuration. Therefore, wind pressure collected by the airflow manipulation arrangements 130 and conducted as wind loads via the support arrangement 120 into the tower segments 105, 106 be reduced. A portion of the airflow of the wind may still flow through the airflow manipulator 131.

FIG. 6 introduces an alternative configuration of the airflow manipulator 131, wherein the material and or fabric 135 of the airflow manipulator 131 comprises openings 136 in order to reduce related wind loads. The size of openings 136 and amount of the openings 136 provided are chosen such, that a buildup of a Kármán vortex street is still prevented by the flat surface of the airflow manipulator 131, wherein wind loads are reduced due to the presence of openings 136.

Furthermore, details of the mounting arrangement 140 are shown in FIG. 6, wherein the inner cable 142 in the outer cable 143 forms a guiding system for the airflow manipulator 131. In fact, the airflow manipulator 131 comprises receptive means, embodied as support devices 144 (holes), through which the inner cable 142, respectively the outer cable 143 are guided.

The inner cable 142 and the outer cable 143 are mounted to the support beams 121 of the upper support portion 123 with the help of support devices 144. For tensioning the cables 142, 143, tensioning devices 145 are provided at the lower support portion 124.

The assembly process of this is can be embodied as follows: while the tower segments 105, 106 are still on the ground 14, the support arrangements 120 are mounted to the tower 107. For example, the respective support beam 121 can protrude the tower 107, wherein (outer and) inner fixation device 122 are provided for mounting the support beam in their perpendicular position with respect to the tower wall 107.

Subsequently, the tower 100 may be erected by placing the tower segments 106, 105 on each other by connecting respective tower flanges 108. Subsequently, the airflow manipulation arrangement 130 can be lifted to the respective tower segment 105, 106. Also, the airflow manipulation arrangement 130 can be mounted to the tower segments 106, 105 prior to erecting these tower segments.

After the nacelle 16 is mounted to a top flange 109 of the upper tower segment 105, the system including the airflow manipulation arrangement 130 is dismounted. For this purpose, assembling cables 110 can be connected to an inner portion of the support beams 121. When removing the respective support fixation device 122, the support beam 121 can be lowered from the tower 100 by releasing the assembling cable 110.

In particular, the support arrangement 120 comprises protection means configured for preventing the tower 100 to be damaged or negatively impacted by support arrangement 120 when being lowered from its mounting position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include elements that do not differ from the literal language of the claims, or if they include equivalent structural elements with insubstantial differences from the literal languages of the claims.

The present invention is not limited to the above-described embodiments and modifications and may be embodied in various forms within the gist thereof. For example, the technical features of the embodiments and modifications corresponding to the technical features according to the aspects described in the Summary of the Invention section may be replaced or combined as appropriate to solve some or all of the above-described problems or obtain some or all of the above-described effects. The technical features may also be omitted as appropriate unless they are described as being essential in this specification.

| REFERENCE NUMBERS | |
|---|---|
| 10 | wind turbine |
| 14 | support system |
| 16 | nacelle |
| 18 | rotor |
| 20 | rotatable hub |
| 22 | rotor blades |
| 24 | blade root portion |
| 26 | load transfer regions |
| 28 | wind direction |
| 30 | axis of rotation |
| 32 | pitch system |
| 34 | pitch axes |
| 36 | wind turbine controller |
| 38 | yaw axis |
| 40 | processor |
| 42 | electric generator |
| 44 | main shaft |
| 46 | gearbox |
| 48 | high speed shaft |
| 50 | coupling |
| 52 | main frame |
| 54 | decoupling support means |
| 56 | yaw drive mechanism |
| 58 | meteorological mast |
| 60 | forward support bearing |
| 62 | aft support bearing |
| 64 | drive train |
| 66 | pitch assembly |
| 68 | pitch drive system |
| 70 | sensor |
| 72 | pitch bearing |
| 74 | pitch drive motor |
| 76 | pitch drive gearbox |
| 78 | pitch drive pinion |
| 80 | pitch control system |
| 100 | tower |
| 101 | tower axis |
| 102 | longitudinal axis |
| 103 | tower diameter |
| 104 | radial direction |
| 105 | upper tower segment |
| 106 | lower tower segment |
| 107 | tower wall |
| 108 | tower flange |
| 109 | top flange |
| 110 | assembling cable |
| 120 | support arrangement |
| 121 | support beam |
| 122 | support fixation device |
| 123 | upper support portion |
| 124 | lower support portion |
| 130 | airflow manipulation arrangement |
| 131 | airflow manipulator |
| 132 | effectively flat surface |
| 133 | upper manipulator portion |
| 134 | lower manipulator portion |
| 135 | fabric |
| 136 | opening |
| 140 | mounting arrangement |
| 141 | mounting means |
| 142 | inner cable |
| 143 | outer cable |
| 144 | support device |
| 145 | tensioning device |

The invention claimed is:

1. A system for a tower segment of a tower of a wind turbine, the tower segment having a longitudinal direction and a radial direction, the system comprising:
   an airflow manipulation arrangement having an airflow manipulator;
   a support arrangement configured with the airflow manipulation arrangement that supports and mounts the airflow manipulation arrangement to the tower segment;
   wherein the airflow manipulation arrangement and the support arrangement are configured such, when mounted to the tower segment, that the airflow manipulator extends longitudinally along the tower segment and projects a tower diameter in a radial direction between 5% and 20% such that a vortex shedding effect affecting the tower segment caused by an airflow facing the tower segment is reduced by the airflow manipulator; and
   the airflow manipulator formed from a material having a relative permeability of at least 500 liter per minute per square meter [l/(min*m2)] such that air flows through the airflow manipulator.

2. The system according to claim 1, wherein the airflow manipulator extends longitudinally along at least 20% of the tower segment.

3. The system according to claim 1, wherein the airflow manipulator comprises an effectively flat surface.

4. The system according claim 3, wherein the support arrangement is configured such that the effectively flat surface deviates from a plane formed by the longitudinal direction and the radial direction by less than 45°.

5. The system according to claim 4, wherein the airflow manipulator is essentially made from a fabric.

6. The system according to claim 1, wherein the airflow manipulator comprises a drag coefficient of not more than 1.

7. The system according to claim 1, wherein the support arrangement comprises a support beam and a support fixation device that mounts the support beam to a tower wall of the wall segment.

8. The system according to claim 7, wherein the support arrangement comprises an upper support portion that receives an upper manipulator portion of the airflow manipulator and a lower support portion that receives a lower manipulator portion of the airflow manipulator such that the airflow manipulator extends in longitudinal direction between the upper support portion and the lower support portion.

9. The system according to claim 8, further comprising a mounting arrangement that mounts the airflow manipulation arrangement to the support arrangement in the longitudinal direction between the upper support portion and the lower support portion.

10. The system according to claim 9, wherein the mounting arrangement comprises a radially inner cable and a radially outer cable, and wherein the support arrangement is configured such that the radially inner cable is arranged more closely to the tower wall than the radially outer cable.

11. The system according to claim 9, comprising at least three of the airflow manipulation arrangements with respective mounting arrangements.

12. The system according to claim 1, comprising assembling means for enabling lowering the support arrangement from the tower.

13. The system according to claim 12, wherein the support arrangement is configured to prevent damage to the tower segment when being lowered from its mounting position.

14. A segment for a wind turbine tower, the segment comprising the system according to claim 1.

15. A wind turbine comprising: a tower; the tower comprising at least one segment according to claim 14.

16. A system for a tower segment of a tower of a wind turbine, the tower segment having a longitudinal direction and a radial direction, the system comprising:
   an airflow manipulation arrangement having an airflow manipulator;

a support arrangement configured with the airflow manipulation arrangement that supports and mounts the airflow manipulation arrangement to the tower segment;

wherein the airflow manipulation arrangement and the support arrangement are configured such, when mounted to the tower segment, that the airflow manipulator extends longitudinally along the tower segment and projects a tower diameter in a radial direction between 5% and 20% such that a vortex shedding effect affecting the tower segment caused by an airflow facing the tower segment is reduced by the airflow manipulator;

the support arrangement comprising a support beam and a support fixation device that mounts the support beam to a tower wall of the wall segment;

the support arrangement comprising an upper support portion that receives an upper manipulator portion of the airflow manipulator and a lower support portion that receives a lower manipulator portion of the airflow manipulator such that the airflow manipulator extends in longitudinal direction between the upper support portion and the lower support portion;

a mounting arrangement that mounts the airflow manipulation arrangement to the support arrangement in the longitudinal direction between the upper support portion and the lower support portion; and the mounting arrangement comprising a radially inner cable and a radially outer cable, and wherein the support arrangement is configured such that the radially inner cable is arranged more closely to the tower wall than the radially outer cable.

17. A system for a tower segment of a tower of a wind turbine, the tower segment having a longitudinal direction and a radial direction, the system comprising:

an airflow manipulation arrangement having an airflow manipulator;

a support arrangement configured with the airflow manipulation arrangement that supports and mounts the airflow manipulation arrangement to the tower segment;

wherein the airflow manipulation arrangement and the support arrangement are configured such, when mounted to the tower segment, that the airflow manipulator extends longitudinally along the tower segment and projects a tower diameter in a radial direction between 5% and 20% such that a vortex shedding effect affecting the tower segment caused by an airflow facing the tower segment is reduced by the airflow manipulator;

a mounting arrangement that mounts the airflow manipulation arrangement to the support arrangement in the longitudinal direction between the upper support portion and the lower support portion; and the mounting arrangement comprising a radially inner cable and a radially outer cable, and wherein the support arrangement is configured such that the radially inner cable is arranged more closely to the tower wall than the radially outer cable.

* * * * *